Patented Nov. 7, 1939

2,179,299

UNITED STATES PATENT OFFICE 2,179,299

SELF-REGULATING BATTERY CHARGER

Slavo J. Murcek, Duquesne, Pa., assignor to Westinghouse Electric & Manufacturing Company, East Pittsburgh, Pa., a corporation of Pennsylvania Application September 14, 1938, Serial No. 229,852

7 Claims. (Cl. 175—363)

My invention relates to automatically controlled battery charging and other equivalent direct current supply systems, and it has particular relation to improvements in systems of the type in which the charging or output current is supplied through a rectifier from an alternating current source of power.

An object of my invention is to provide an improvement in the circuit described in the patent to C. V. Aggers 2,114,827 issued April 19, 1938 for Battery charging regulator.

Another object of my invention is to permit automatically overcharging of a battery if desired or necessary.

Another object of the invention is to prevent the automatic charging system from running away if the battery potential should become greater than the charging potential.

Another object of the invention is to provide a charging system having a greater sensitivity to voltage changes.

Another object of the invention is to provide a charging system utilizing contact rectifiers in which the effect of temperature on the contact rectifiers is compensated to a great extent.

Figure 1:
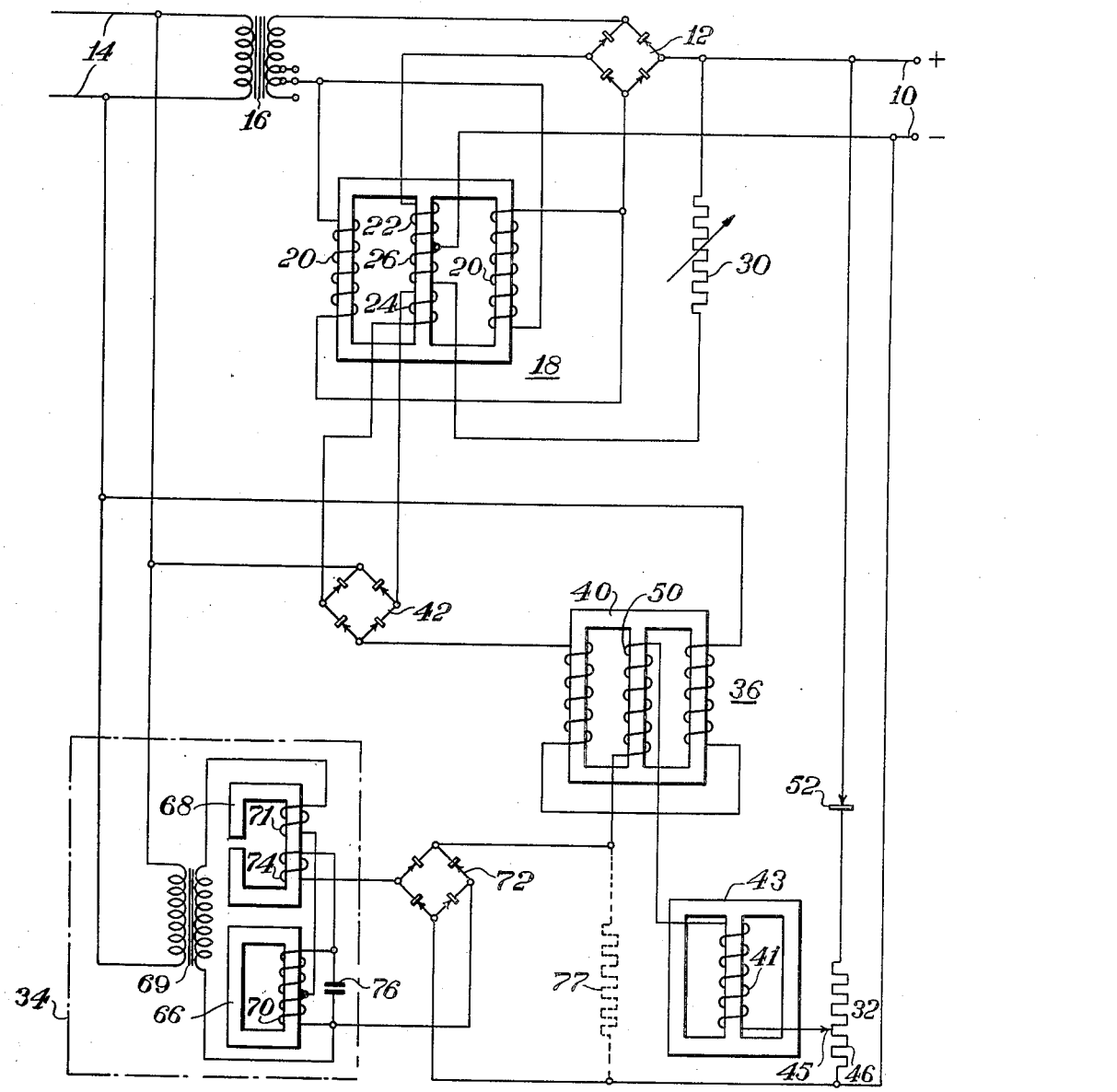

Other objects and advantages of the invention will be apparent from the following description and drawing, in which Figure 1 is a diagrammatic representation of apparatus and circuit comprising a preferred form of the regulating system of my invention.

Figure 2:
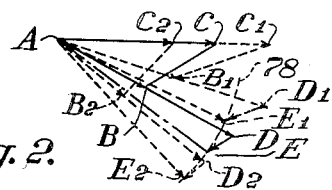

Fig. 2 is a diagram of voltage vectors illustrating the manner of operation of the reference voltage supply equipment of Fig. 1.

As stated above, my invention is an improvement on that described in the Aggers Patent 2,114,827. My invention, in general, concerns certain changes in the control or so-called "pilot" circuit for the saturable reactor and rectifier described in the patent by which I make a still further advance in the battery charging art over the decided improvement disclosed in the Aggers patent referred to above.

Referring to the drawing, the regulating system in the Figure 1 is shown as being adapted to automatically control, as explained below, the charging current supplied to a storage battery or other direct current load 10 through a full-wave rectifier 12, of the copper-oxide disc or other suitable type, from an alternating-current power circuit 14. To adjust the magnitude of this current, a saturable-core reactor 18 is connected intermediate the rectifier and its supply transformer 16.

In the illustrated connection, the circuit through which the battery-charging or other output current is supplied includes the windings 20 carried on the two outer legs of the reactor core structure. The central leg of this structure carries a plurality of windings, indicated at 22, 24 and 26, which jointly control the degree of magnetic saturation of the core to thereby determine the effective impedance presented to the flow of current by the before-mentioned windings 20.

In order that changes in the state of charge of the battery 10 and in the magnitude of the load current which supplies to the consumption circuit may alter the charging current in a manner tending to maintain constant the battery voltage, I energize the saturation control winding 22 by a measure of the charging current supplied to the battery. When the battery voltage drops, either because of an increase in load drawn by the consumption circuit or due to a relatively low state of charge, the resulting tendency for the charging current to increase is amplified by the increased degree of core saturation which the winding 22 imparts to the reactor. The resulting lowered reactor impedance further raises the charging current to thereby cause the battery voltage to more closely approach the value which it is desired that the charging system maintain.

Another beneficial effect of the described arrangement is that it also compensates for changes in the voltage drop through the impedance of the rectifier 12. In rectifiers of the copper-oxide disc type, which are now so extensively used in charging systems of the subject class, this impedance tends to increase with use, and to take account of this ageing effect, I further connect in shunt circuit relation with the saturation control winding 22 of the main reactor 18 a winding 26 on the central leg of the main reactor 18 and an adjustable resistor or rheostat 30, the setting of which may from time to time be changed to restore the proper relation between the rectifier impedance and the saturating effect of winding 22. Preferably, the resistor 30 is of the order of 300 ohms.

For the purpose of enabling my improved charging system to maintain uniform voltage at the battery 10 even when that of the supply circuit 14 widely fluctuates, I provide means for energizing the saturation control winding 24 of the reactor 18 by a current which is determined by the difference between the battery voltage and that appearing across a reference potential resistor 32, upon which is impressed, by means of an apparatus 34 to be more completely described, a unidirectional voltage of substantially constant magnitude. While I have disclosed a resistance 32, this may also be an inductance. The value of this resistance is preferably of the order of 1,000 ohms. In the interests of making this portion of the charging-current control system more sensitive, I amplify this voltage difference, preferably through the use of one or more stages of magnetic amplifying apparatus.

In the Aggers patent previously referred to a plurality of stages is disclosed but for the sake of simplicity I have disclosed one stage generally indicated at 36. This stage 36 includes a saturable core reactor 40 which determines the current supplied to a rectifier 42. The rectifier 42 has its output connections connected to the coil 24 on the middle leg of the main saturable reactor 18. The reactor 40 has its control winding 50 connected to the positive output terminal of a rectifier 72 connected to the source of reference potential 34, and its other terminal connected through a winding 41 on a reactor 43 and to a tap 45 on the resistance 32. Lower portion 46 of the reference resistor 32 is connected to the negative output terminal of the rectifier 72.

Normally the voltage across the reference potential resistor 32 slightly exceeds that of the battery 10 and thereby causes to flow in the control winding 50 of the reactor 40 a current which directly varies with the magnitude of this difference. The tap 45 can be adjusted, however, if it is desired that the battery be overcharged because the potential drop across the portion 46 of the reference resistance will prevent an excess voltage applied to the control circuit. A rectifier 52 is placed in the connection between the reference resistance 32 and the positive bus bar of the output circuit, so that the current will always flow in the desired direction. The voltage drop across this rectifier 52 will remain constant with the result that voltage fluctuations will only affect resistance 32.

In operation, as the battery voltage drops, reactor 40 becomes more saturated and passes through rectifier 42 more current to the saturation control winding 24 of the main reactor 18, and thereby causes the reactor to appropriately increase the charging current. As the battery voltage rises it more nearly approaches that of the reference resistor 32, the saturation of reactor 40 is correspondingly reduced with the result that the winding 24 tends to cause the main reactor 18 to reduce the battery charging current.

The saturation control winding 26 is arranged to magnetically oppose the before-mentioned winding 24 to thereby reduce the effect of the uncontrolled component of current flow therethrough. As a result, increases in the power source voltage tend to neutralize the effect of winding 24 which otherwise would impart to the main reactor 18 an excessive degree of saturation. With the arrangement described, however, changes in the power-source voltage are effective to recalibrate the control means, including winding 24 and the reference potential resistor 32, in a manner to allow the complete system to more properly and more sensitively function.

This last described combination of saturation control influences cooperates with the first-named control winding 22 to effect the desired constancy of voltage maintenance across the battery 10. Inasmuch as it is desired that a decrease in the battery voltage, whether due to elevated loading, low state of charge, or low rate of charging current, increase the rate of the charging current to thereby correctively raise the terminal voltage, the charging current responsive winding 22 of the current adjusting reactor 18 is arranged to aid or act cumulatively with the battery voltage responsive winding 24. The resulting cooperation, in conjunction with the power source voltage change-responsive winding 26, is to maintain the battery voltage within much closer limits than has been possible with charging current regulating systems heretofore known. In practice, limits as close as one-half of 1% are readily made possible by my improved system.

One aspect of this system provides a static regulator for maintaining a reference potential. This may take the form of the static regulator 34, through which the voltage of power circuit 16 is caused to impress upon the reference resistor 32 a potential which may either be maintained constant for variations in the power source voltage or may be made to change in a predetermined manner as this voltage changes.

Preferably, this equipment 34 comprises a pair of core structures 66 and 68 which are designed to operate at different degrees of magnetic saturation, structure 66 being highly saturated, and structure 68 being relatively unsaturated. The voltage of the circuit 16 is impressed, in the connection shown, through a transformer 69 upon a pair of series connected windings 70 and 71 respectively carried by the two named structures. In this core exciting connection only the lower portion of winding 70 is active. The output voltage is impressed upon a rectifier 72, to the output terminals of which the before-referred-to reference resistor 32 is connected. This voltage is made up of the voltage appearing across the entire length of winding 70 and that of an opposition connected winding 74. A capacitor 76 connected in parallel circuit relation with the winding 70 functions to further shift the phase of the currents supplied to the exciting windings of the two cores.

The manner in which the equipment 34 operates is illustrated by the vector diagram of Fig. 2. At an intermediate value of supply voltage A—C, the potential appearing across the lower portion of the saturated-core carried winding 70 is represented by vector A—B, and that appearing across the winding 71 of the unsaturated core by vector B—C. The potential induced in the upper portion of winding 70 is represented by vector B—D, while that induced in winding 74 is shown by vector D—E. The output voltage (impressed upon rectifier 72) A—E is the vector sum of voltages A—D and D—E and falls upon the arc of a circle 78.

As the supply voltage is increased to A—$C_1$, for example, its division between the two core structure windings changes to that shown by vectors A—$B_1$ and $B_1$—$C_1$. The output voltage A—$E_1$ is then determined by the two vectors A—$D_1$ and $D_1$—$E_1$. While somewhat shifted in phase position, the magnitude remains unchanged, the end of vector $D_1$—$E_1$ falling upon the circle arc 78. In a similar manner, as the supply voltage decreases to A—$C_2$, the output voltage impressed upon the rectifier 72 is given by the vector A—$E_2$, which is still of the same magnitude though shifted in phase position in the opposite direction.

The above assumed constant magnitude relation is, of course, available when the electrical constants of all of the different elements comprised by the equipment 34 are properly correlated, which correlation, in practice, is readily obtained. By changing this correlation, however, the output voltage of the equipment may be either made to rise or fall as the supply voltage increases or decreases, and thus still further broadens the compensating possibilities of the before-described battery charging system.

In situations in which the frequency of the supply circuit voltage is subject to substantial variations it may be desirable to omit from equipment 34 the capacitor 76 in order that these variations will not affect the equipment output potential. Such an omission can be compensated for by making certain other portions of the equipment circuits of more substantial electrical dimensions.

The connections disclosed are generally used for 110 or 120 volt battery outfits. If the charger is utilized for a different voltage battery outfit, then a suitable step down or step up transformer may be inserted between 34 and the rectifier bridge 72.

The reactor 43 tends to smooth out the control or "pilot" current wave form and also saturates as the current increases, making the control circuit of greater sensitivity to voltage changes. The voltage drop across the portion 46 of the reference resistance 32 is always less than the reference potential supplied by 34. In case the voltage of the output circuit increases, there will be no danger of such voltage affecting the control circuit by reversing the voltage therethrough because the rectifier 72 will oppose any passage of current from the resistor 32 through the reactor coil 41 and the control coil 50 of the reactor 40. It is also to be noted that the rectifier 52 and the rectifier 72 are so connected that if the ambient temperature increases to decrease the rectifier resistance that the effects on these two rectifiers will be opposed to one another and result in little, if any, change in regard to the circuit as a whole.

In the event that large "pilot" currents are to be drawn through the control winding 50 of the reactor 36 because of low voltage operation, then it may be desirable to insert a resistance 77 which would be large enough to fix the temperature characteristics of the rectifier 72 across which it is connected. The value of resistance 77 might range from 750 to 3,000 ohms.

While I have described a preferred embodiment of my invention, it is apparent that many changes may be made in the form, arrangement and numbers of the various elements incorporated therein. Accordingly, I desire only such limitations to be impressed upon the following claims as is necessitated by the prior art.

I claim as my invention:

1. In a system interconnecting input and output circuits comprising rectifier means supplying unidirectional current to said output circuit from alternating current in said input circuit, the combination of a saturable core reactor connected intermediate the input circuit and the rectifier means, a control circuit for said reactor including a plurality of saturating windings, a source of reference potential, impedance means connected across said output circuit, said control circuit connected intermediate said source of reference potential and said impedance means so as to be energized in accordance with the difference in voltage between said reference potential and a voltage drop in said impedance means.

2. In a system interconnecting input and output circuits comprising rectifier means supplying unidirectional current to said output circuit from alternating current in said input circuit, the combination of a saturable core reactor connected intermediate the input circuit and the rectifier means, a control circuit for said reactor including a plurality of saturating windings, impedance means connected across said output circuit, a portion only of said impedance means connected to said control circuit, and means intermediate said portion of said impedance means and said control circuit accentuating the degree of sensitivity of the control circuit to voltage changes.

3. In a system interconnecting input and output circuits comprising rectifier means supplying unidirectional current to said output circuit from alternating current in said input circuit, the combination of a saturable core reactor connected intermediate the input circuit and the rectifier means, a control circuit for said reactor including a plurality of saturating windings, impedance means connected to said output circuit and said control circuit, means permitting current from said output circuit to pass through said impedance means and for permitting current from said control circuit to pass through said impedance means but preventing the current from said output circuit from passing to said control circuit.

4. In a system interconnecting input and output circuits comprising rectifier means supplying unidirectional current to positive and negative terminals of said output circuit from alternating current in said input circuit, the combination of a saturable core reactor connected intermediate the input circuit and the rectifier means, a control circuit for said reactor including a plurality of saturating windings, a source of reference potential having positive and negative connections, impedance means having one end connected to both the negative terminal of the output circuit and the negative connection of the reference connection and the other end connected to both the positive terminal of the output circuit and to the positive connection of the reference potential through a portion of said control circuit.

5. In a system interconnecting input and output circuits comprising rectifier means supplying unidirectional current to positive and negative terminals of said output circuit from alternating current in said input circuit, the combination of a saturable core reactor connected intermediate the input circuit and the rectifier means, a control circuit for said reactor including a plurality of saturating windings, a source of reference potential having positive and negative connections, impedance means having one end connected to both the negative terminal of the output circuit and the negative connection of the reference connection and the other end connected to both the positive terminal of the output circuit and to the positive connection of the reference potential through a portion of said control circuit, and means preventing current flow from said impedance means to the positive terminal of said output circuit.

6. In a system interconnecting input and output circuits comprising rectifier means supplying unidirectional current to positive and negative terminals of said output circuit from alternating current in said input circuit, the combination of a saturable core reactor connected intermediate the input circuit and the rectifier means, a control circuit for said reactor including a plurality of saturating windings, a source of reference potentials having positive and negative connections, impedance means having one end connected to both the negative terminal of the output circuit and the negative connection of the reference connection and the other end connected to both the positive terminal of the output circuit and to the positive connection of the reference potential through a portion of said control circuit, and means preventing current flow from said positive terminal of said output circuit flowing to said control circuit through said impedance means.

7. In a system interconnecting input and output connections comprising rectifier means supplying unidirectional current from alternating current in said input circuit, the combination of a saturable core reactor connected intermediate the input circuit and the rectifier means, a control circuit for said reactor including a plurality of saturating windings, a source of reference potential including a contact rectifier, an impedance connected to said source of reference potential, said control circuit and said output circuit, a contact rectifier intermediate said impedance means and said output circuit, said contact rectifiers being connected to prevent passage of current from said output circuit to said control circuit.

SLAVO J. MURCEK.